US010630639B2

(12) United States Patent
Bilsten

(10) Patent No.: US 10,630,639 B2
(45) Date of Patent: Apr. 21, 2020

(54) SUGGESTING A DOMAIN NAME FROM DIGITAL IMAGE METADATA

(71) Applicant: Go Daddy Operating Company, LLC, Scottsdale, AZ (US)

(72) Inventor: Jesse Bilsten, San Luis Obispo, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 245 days.

(21) Appl. No.: 15/688,700

(22) Filed: Aug. 28, 2017

(65) Prior Publication Data
US 2019/0068551 A1    Feb. 28, 2019

(51) Int. Cl.
*H04L 29/12* (2006.01)
*G06F 15/16* (2006.01)
*G06F 3/0482* (2013.01)
*G06F 16/58* (2019.01)
*G06F 3/0481* (2013.01)
*G06F 16/955* (2019.01)

(52) U.S. Cl.
CPC ........ *H04L 61/3025* (2013.01); *G06F 3/0481* (2013.01); *G06F 3/0482* (2013.01); *G06F 15/16* (2013.01); *G06F 16/5866* (2019.01); *G06F 16/955* (2019.01); *H04L 61/302* (2013.01)

(58) Field of Classification Search
CPC .......... G06F 3/0481–0482; G06F 16/2365–26; G06F 16/48; G06F 16/58–5866; G06F 16/9535–958; G06Q 10/00–10; H04L 61/3025; H04N 21/00; H04N 21/2225–2665
See application file for complete search history.

(56) References Cited

U.S. PATENT DOCUMENTS

| 2007/0022085 | A1* | 1/2007 | Kulkarni | G06F 16/9566 |
| 2008/0267505 | A1 | 10/2008 | Dabet et al. | |
| 2009/0043798 | A1 | 2/2009 | Tan et al. | |
| 2010/0211575 | A1* | 8/2010 | Collins | G06F 16/489 |
| | | | | 707/749 |
| 2010/0223132 | A1* | 9/2010 | Lee | G06Q 30/02 |
| | | | | 705/14.53 |
| 2010/0223278 | A1* | 9/2010 | Lee | G06Q 10/00 |
| | | | | 707/769 |
| 2011/0093444 | A1 | 4/2011 | Mayle et al. | |
| 2011/0231280 | A1 | 9/2011 | Farah | |
| 2013/0073520 | A1* | 3/2013 | Ng | G06F 16/254 |
| | | | | 707/610 |
| 2013/0086081 | A1* | 4/2013 | Schonfeld | G06F 16/958 |
| | | | | 707/748 |
| 2013/0195429 | A1 | 8/2013 | Fay et al. | |

(Continued)

*Primary Examiner* — Hitesh Patel
(74) *Attorney, Agent, or Firm* — Greenberg Traurig, LLP

(57) ABSTRACT

Systems and methods of the present invention provide for a server computer coupled to a network and configured to: receive an image; transmit the digital image to an API operated by at least one metadata generation service, and receive a metadata data set about the digital image, prioritize a plurality of keywords within the data set, generate a list of candidate domain names including a keyword, insert a second candidate domain name into the list comprising a keyword replacing or concatenated to the keyword and associated with a lower priority than the keyword; and transmit the list to a client computer for display.

20 Claims, 9 Drawing Sheets

(56) References Cited

U.S. PATENT DOCUMENTS

| | | | |
|---|---|---|---|
| 2013/0218898 A1* | 8/2013 | Raghavan | G06F 16/2433 |
| | | | 707/741 |
| 2013/0343659 A1 | 12/2013 | Nakada et al. | |
| 2015/0058177 A1* | 2/2015 | McLaughlin | G06Q 30/0637 |
| | | | 705/26.82 |
| 2015/0058330 A1* | 2/2015 | Carroll | G06F 16/9535 |
| | | | 707/723 |
| 2015/0106725 A1* | 4/2015 | Kamdar | H04L 61/3025 |
| | | | 715/739 |
| 2015/0220787 A1* | 8/2015 | Folkens | G06F 16/5838 |
| | | | 382/103 |
| 2015/0363503 A1* | 12/2015 | Scheuernnan | G06F 17/2235 |
| | | | 715/202 |
| 2016/0140454 A1* | 5/2016 | Gupta | G06Q 50/01 |
| | | | 706/12 |
| 2017/0193119 A1* | 7/2017 | Unni | H04L 67/02 |
| 2017/0359236 A1* | 12/2017 | Circlaeys | H04L 43/045 |
| 2018/0309720 A1* | 10/2018 | Cochran | H04L 61/3025 |
| 2019/0065613 A1* | 2/2019 | Bilsten | G06F 3/0482 |
| 2019/0065614 A1* | 2/2019 | Bilsten | G06Q 10/10 |
| 2019/0080175 A1* | 3/2019 | Buratti | H04N 21/00 |

* cited by examiner

File  Edit  Tools

Domain Name Suggestion and Website Generation Control Panel

Image Captured: JohnDoeJewelersBusinessCard.jpg

Metadata services Used: Object ID; Location; OCR; Color; Logo ID;

Generating Entity Profile for John Doe Jewelers and Company .....

Suggested Domain Names: johndoe.com - add; johndoe.us - add; johndoejewelers.com - add; johndoesanluisobispo.com - add; 123higuera.com - add; sanluisobispo.city - add Website Preview/Editing GUI:

*John Doe Jewelers and Company*          About Us/Contact      Jewelry - Edit

Welcome to John Doe Jewelers and Company. We sell only the finest jewelry - Edit Contact Us: - Edit
John Doe Jewelers and Company          Your Email: [          ]
123 Higuera
San Luis Obispo, CA                    Message: [          ]

Additional Recommended Products: GetFound - add; Website Builder - add;

Form Data to be Applied to Selected Products, DNS, and WHOIS:

Admin: [John Doe]   Organization: [John Doe Jewelers and Company]
Location: [123 Higuera San Luis Obispo, California]

FIG. 4

```
File  Edit  Tools          ⇐ ⇒
```

Domain Name Suggestion and Website Generation Control Panel

Image Captured: | 123MainStreetVictorianHouse.jpg |

Metadata services Used: Object ID; Location; Color; Logo ID; Facial ID; OCR;

Generating Entity Profile for Jenny Smith, Acme Real Estate, 123 Main Street .....

Suggested Domain Names: 123mainstreet.com - add; 123mainstreet-victorian.com - add; 123mainstreet-jennysmith.com - add;

Website Preview/Editing GUI:

Jenny Smith - Acme Real Estate Agent - 123 Main Street - Edit

About Us/Contact    Listings - Edit

Come see this amazing Victorian house at 123 Main Street. Use the contact form below to get in touch with Jenny Smith and let her know you're interested. - Edit Edit
Address: 123 Main Street - See Images
Home Style: Victorian                           Your Email: [            ]
Asking Price: $300,000
                                                Message: [            ]

Additional Recommended Products: GetFound - add; Website Builder - add;

Form Data to be Applied to DNS, WHOIS, and Selected Products:

Admin: | Jenny Smith |   Organization: | Acme Real Estate |
Location: | 123 Main Street, Anywhere, USA |

FIG. 5

File  Edit  Tools

Domain Name Suggestion and Website Generation Control Panel

Image Captured: GreasySpoonMenu.jpg

Services Used: OCR; Location; Color; Logo ID; Object ID; Facial ID;

Generating Entity Profile for Greasy Spoon Restaurant .....

Suggested Domain Names: greasyspoon.com - add;

Website Completion Checklist - Incomplete, see below:

Storefront image - not complete, upload storefront image
Owner image - not complete, upload storefront image
Menu listing and prices - complete
Menu item identification and images - upload storefront image
Location/contact data - not complete, input location/contact data Website Preview/Editing GUI:

| The Greasy Spoon - Menu | About Us | Menus - Edit |

Edit
Burgers
Super Cheesy Cheeseburger          8.99 - See details
Mac and Cheese Cheeseburger        9.99 - See details
Sandwiches
Reuben Sandwich                    7.99 - See details
French Dip                         8.99 - See details

FIG. 9

SUGGESTING A DOMAIN NAME FROM DIGITAL IMAGE METADATA

FIELD OF THE INVENTION

The present invention generally relates to website design and communication, and, more specifically, to systems and methods for automatically generating, from metadata generated from a transmitted digital image, a video, a set of images or videos, and/or any other supplemental native device telemetry crossed with publicly available data, a list of recommended available domain names, and/or an organization specific website (possibly including one or more web pages for products available through the organization) generated from content received from, for example, an owner of a business, or a customer of the business desiring a website for the business. The metadata may further be used to automatically populate one or more online forms for administering the website or ordering additional products.

BACKGROUND OF THE INVENTION

The Internet comprises a vast number of computers and computer networks that are interconnected through communication links. The interconnected computers exchange information using various services. In particular, a server computer system, referred to herein as a server, may connect through the Internet to a remote client computer system, referred to herein as a client, and may send, to the client upon request, one or more websites containing one or more graphical and textual web pages of information. A request is made to the server by visiting the website's address, known as a Uniform Resource Locator (URL). Upon receipt, the requesting client device can display the web pages. The request and display of the websites are typically conducted using a browser. A browser is a special-purpose application program that effects the requesting of web pages and the displaying of web pages.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A URL is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name. A domain can further host multiple websites that can be accessed by appending character strings that constitute the full path to the website's files. For example, the domain for FACEBOOK includes one or more websites, as the term is used herein, for each of its users. A user-specific website is requested by appending a directory to the FACEBOOK main URL, e.g.: http://www.facebook.com/username.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. Otherwise, the Internet user may keep selecting alternative domain names until an available domain name is found. Domain names are typically registered for a period of one to ten years with first rights to continually re-register the domain name.

The information on web pages is in the form of programmed source code that the browser interprets to determine what to display on the requesting device. The source code may include document formats, objects, parameters, positioning instructions, and other code that is defined in one or more web programming or markup languages. One web programming language is HyperText Markup Language ("HTML"), and all web pages use it to some extent. HTML uses text indicators called tags to provide interpretation instructions to the browser. The tags specify the composition of design elements such as text, images, shapes, hyperlinks to other web pages, programming objects such as JAVA applets, form fields, tables, and other elements. The web page can be formatted for proper display on computer systems with widely varying display parameters, due to differences in screen size, resolution, processing power, and maximum download speeds.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other. However, presently-existing systems and methods for designing and launching a website require a user wishing to establish an online presence to navigate through a complicated series of steps to do so. First, the owner must register a domain name. The owner must then design a website, or hire a website design company to design the website. Then, the owner must purchase, configure, and implement website-related services, including storage space and record configuration on a web server, software applications to add functionality to his website, maintenance and customer service plans, and the like. This process can be complicated, time-consuming, and fraught with opportunity for user error. It may also be very expensive to produce, serve, and maintain the user's website. Merchants may be hesitant to create an online presence because of the perceived effort involved to do so. These merchants limit their business to offline "brick and mortar" points of sale.

Some existing domain name search and website design approaches can simplify the design process through automation of certain of the design process steps. Typically, a user is provided a template comprising a fully or substantially hard-coded framework. The user must then customize the framework by providing content, such as images, descriptive text, web page titles and internal organizational links between web pages, and element layout choices. While the resulting website may be customized to the user's preferences and may present the desired information, the design process remains complicated and time-consuming because the user must identify, locate, prepare, and upload all of the desired content and then organize it within the web pages of the website.

BRIEF DESCRIPTION OF THE DRAWINGS

FIG. 4 is an example graphical user interface (GUI) of an example embodiment recommending domain names and automatically generating an organization specific website from digital image metadata.

FIG. 5 is an example GUI of an example embodiment recommending domain names and automatically generating an organization specific website from digital image metadata.

FIG. 9 is an example GUI of an example embodiment recommending domain names and automatically generating an organization specific website from digital image metadata.

DETAILED DESCRIPTION OF THE PREFERRED EMBODIMENT

Figure 1:
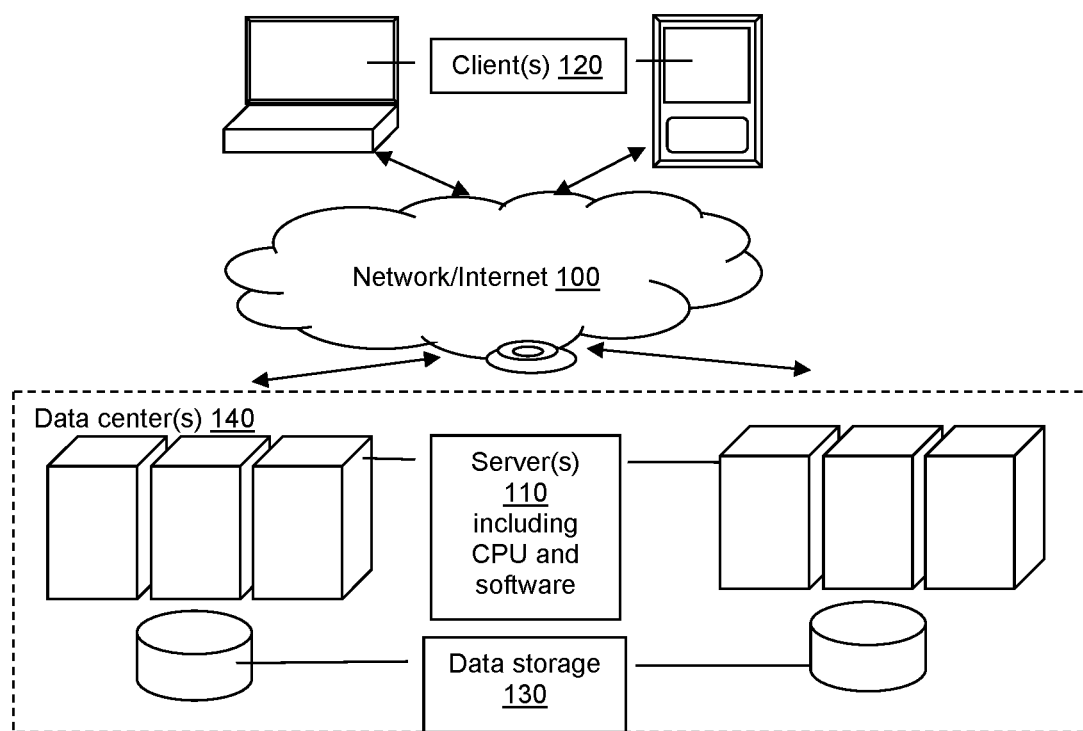
FIG. 1 is a schematic diagram of a system and associated operating environment in accordance with the present disclosure.
Figure 2:
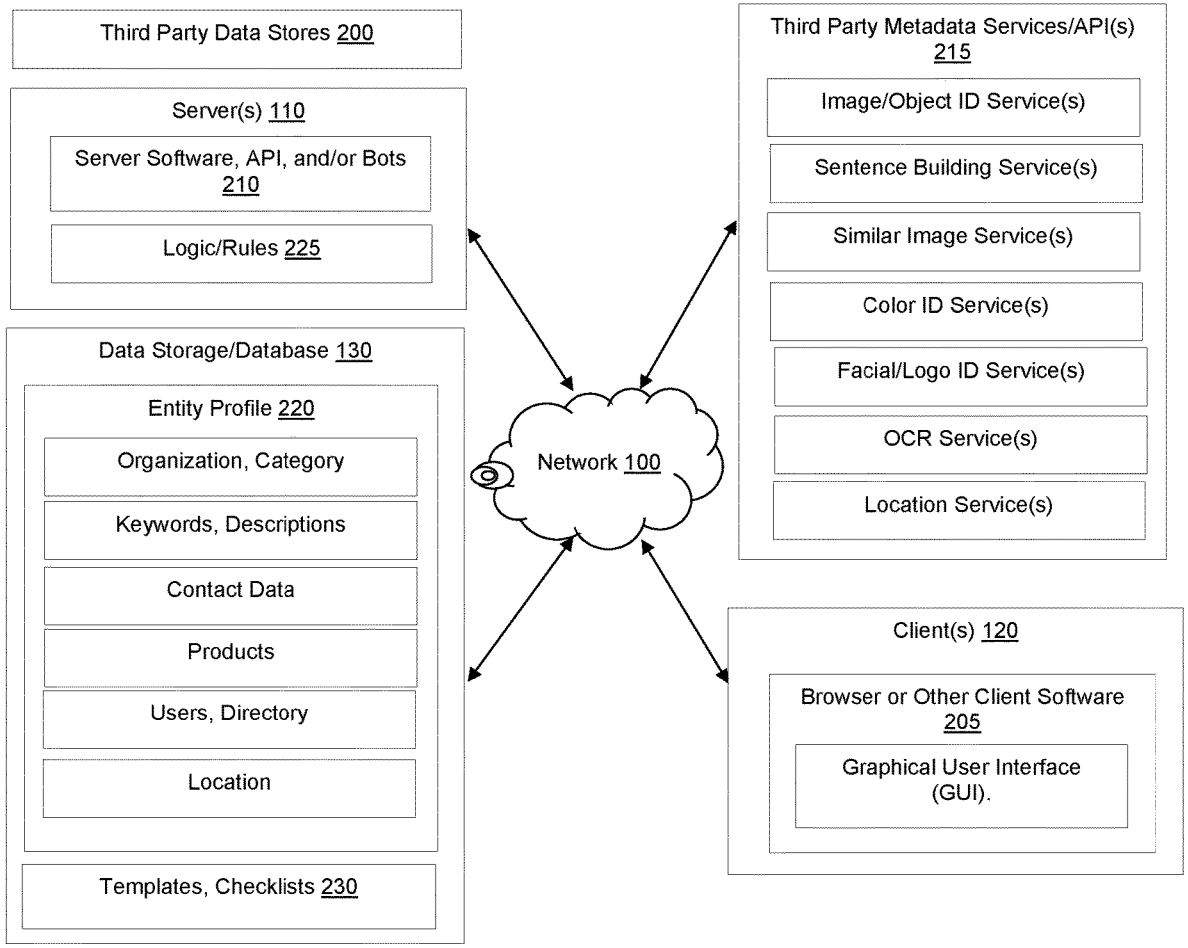
FIG. 2 is a more detailed schematic block diagram of a system and associated environment for recommending domain names and automatically generating an organization-specific website from digital image metadata.

The present invention overcomes the aforementioned drawbacks by providing a system and method for automatically generating a list of recommended domain names or an organization-specific website. The list of domain names or organization-specific website may be generated using data extracted from an uploaded digital image, video, set of images or videos, and/or supplemental native device telemetry crossed with publically available data, and the website may include website components such as layout, text and multimedia content, product presentation, and/or GUI form interaction.

The server infrastructure, also known as a hosting provider, may perform one or more algorithms for the domain name recommendation or website creation. Alternatively, the one or more servers operated by the hosting provider may assign the generation to a related computer system, such as one or more additional web servers, dedicated data processing computers, or other computers capable of performing the creation algorithms. Alternatively, a standalone program may be delivered to and installed on a personal computing device, such as the user's desktop computer or mobile device, and the standalone program may be configured to cause the personal computing device to perform the creation algorithms. For clarity of explanation, and not to limit the implementation of the present methods, the methods are described below as being performed by one or more servers that serve data to one or more requesting devices or clients. The creation of websites is described with a left-sided prioritization for left-to-right reading countries; it will be understood that left and right directions may be reversed for right-to-left reading countries.

To operate the disclosed invention, a user accesses a client software (e.g., a mobile device app or web browser) running on the user's client device. The client device may also include a camera application, a GPS application, and storage for one or more multimedia files, such as previously-stored digital images captured from a digital camera, video files, audio files, etc.

Using a provided GUI, the user may direct the client software to either capture (sing the camera application, for example), or select from storage, a multimedia file such as a digital image, images, video, and/or videos. It is important to note that, in addition to single digital images, additional value is derived within the relationship between many images and not just one (e.g., a set of images taken in sequence and along a trail that could communicate an individual documenting a trip, from which a website could be built documenting a person's vacation and where they traveled and stayed in order to remember and share it). The digital image, images, video, and/or videos in this example may be crawled to identify any associated metadata, such as the filename, the source of the image, a date on which the image was captured, or a geolocation associated with the image using the GPS application, etc. The image and any associated metadata may be transmitted to one or more image analysis and metadata generation services, possibly after being uploaded to a server for additional analysis.

The analysis and metadata generation services may generate keywords and descriptions, object tags, trade dress, and location data, as non-limiting examples, from the received image and return them to one or more servers for analysis. The server(s) may compare this received metadata with data in a data storage, possibly including one or more third party data stores, to identify an organization or individual associated with the digital image. The server(s) may create an entity profile for the organization or individual from the received metadata, and organize the received metadata into a neural network of data records defining, for the organization or individual: an industry category, location data (e.g., business address), contact data (e.g., business email, phone, address), trade dress (e.g., logos, colors), keywords or descriptions, tag data, products, directories, schedules, etc. The neural network may include one or more hierarchies of data defining parent-child relationships, or other data priorities among the data in the entity profile.

The system may also: suggest to create relationships between photos and/or videos, as well as with other websites for the customer. E.g. Posting the Real Estate listing to Zillow, RedFin, or their brokers website for the customer; or utilize the data in the entity profile to recommend domain names for the entity, automatically generate a website for the entity, either at an entity member's request, or at the request of a third party, or may create web pages for the entity, displaying the directory and/or schedules, one or more products available through the entity. Thus, not only can the system create a website for the customer, but may also automatically link the captured data or the created website to other websites in order to populate those for the customer as well. For example, a business could have a social media page (e.g., Yelp) automatically filled out including the digital photos taken, a real estate business could post a real estate listing, or a retail business could automatically post used products to an auction website such as eBay, Cragslist, etc. The system may also utilize the entity data to automatically populate one or more HTML forms required to purchase an online product, or provide data for registering the product with an appropriate entity (e.g., generating WHOIS data for a registered domain name).

In order to automatically generate one or more recommended domain names, the disclosed system may prioritize the keywords stored in association with the entity, and identify keywords associated with a high priority in the hierarchy. These keywords may be assigned a high priority according to, for example: the at least one keyword being displayed in a particular a font size, a bolded font, italicized font, etc. within the digital image; a number of times a particular keyword is found within a description or a tag associated with one or more objects identified in the digital image; or a size of the at least one keyword relative to at least one additional text string extracted from the digital image using optical character recognition (OCR). The system may then generate one or more candidate domain names, adding one or more first candidate domain names to a list that include the high priority keywords. The system may then generate one or more additional candidate keywords with a lower priority, and add them to the domain name candidate list, and transmit and display the list on a client device.

In order to automatically generate a website for the entity, the disclosed system may identify an industry category associated with the entity identified in the entity profile, and select a website template from the database associated with that industry category. The system may then generate a customized website for the entity, populating content areas within the website template for an individual or organization name, contact data, and any associated trade dress, such as a logo or color theme. The website may also include any other content generated from the entity profile data set, such as images and descriptions, and transmit and display the customized website on a client device, possibly for purchase.

In order to automatically generate a website for the entity requested by a third party (e.g., a customer of a business), the disclosed system may receive a request from the third party for the website, and select a website template, as described above, as well as a checklist of website content needed for a completed website and a threshold of content needed for the website to be considered complete. Using the data from the generated entity profile, the system may determine if the threshold of content has been met. If not, the disclosed system may send any remaining items on the checklist to the third party and any additional third parties that have expressed interest in a website for the entity. However, if the threshold has been met, the system may generate the completed website, and send it to the entity, allowing the entity to purchase the completed website.

Referring to FIG. 1, server hardware computing machines or devices, referred to herein as servers 110, may be configured to communicate over the Internet or any other network 100 with one or more client hardware computing machines or devices, referred to herein as clients 120, in order to serve requested content or other data to the client 120. Client 120 may request the content or data using any electronic communication medium, communication protocol, and computer software suitable for transmission of data over network 100. Examples include, respectively and without limitation: a wired connection, WiFi or other wireless network, cellular network, or satellite network; Transmission Control Protocol and Internet Protocol ("TCP/IP"), Global System for mobile Communications ("GSM") protocols, code division multiple access ("CDMA") protocols, and Long Term Evolution ("LTE") mobile phone protocols; and web browsers such as GOOGLE CHROME, MICROSOFT INTERNET EXPLORER, MOZILLA FIREFOX, and APPLE SAFARI.

Client 120 may be any device for which web pages or client software applications 205 are typically designed without concern for display, user interface, processing, or Internet bandwidth limitations, including without limitation personal and workplace computing systems such as desktops, laptops, and thin clients, each with a monitor or built-in large display (collectively "PCs"). Client 120 may be any device that can display the informational and functional content of web pages or other client-side software that are designed for viewing on PCs. Such limited devices include mobile devices such as mobile phones and tablet computers, and may further include other similarly limited devices for which conventional websites are not ordinarily designed. Mobile devices, and mobile phones in particular, have a significantly smaller display size than PCs, and may further have significantly less processing power and, if receiving data over a cellular network, significantly less Internet bandwidth.

Server 110 may be configured to create a domain name or website that adapts to the requirements client devices 120 with different capabilities as described above. In some embodiments, such adaptation may include generating a list of candidate domain names or a plurality of versions of a website that convey substantially the same content but are particularly formatted to be displayed on certain client devices 120, in certain browsers, or on certain domains (e.g. FACEBOOK or GOOGLE+). For example, server 110 may generate a first version of the website that is formatted for PCs, and a second version of the website that is formatted for display on mobile phones. In other embodiments, such adaptation may include converting a website from a format that can be displayed on one type of client device 120 into a website that can be displayed on another type of client device 120. For example, server 110 may, upon receiving a request for the website from a mobile phone, convert the website designed to be displayed on a PC into a format that can be displayed on the mobile phone.

In the present disclosure, therefore, the term website refers to any public, private, or semi-private web property on which a user may maintain information and allow the information to be presented to the public or to a limited audience, and which is communicable via network 100. Non-limiting examples of such web properties include websites, mobile websites, web pages within a larger website (e.g. profile pages on a social networking website, ecommerce product pages, etc.), vertical information portals, distributed applications, and other organized data sources accessible by any device that may request data from a storage device (e.g., a client device in a client-server architecture), via a wired or wireless network connection, including, but not limited to, a desktop computer, mobile computer, telephone, or other wireless mobile device; content feeds and streams including RSS feeds, blogs and vlogs, YOUTUBE channels and other video streaming services, and the like; and downloadable digital platforms, such as electronic newsletters, blast emails, PDFs and other documents, client software programs, and the like.

Server 110 may be configured to communicate electronically with one or more data storage repositories and/or data stores 200, possibly operated by third parties and/or associated with data storage 130, in order to retrieve information from, and/or store data within, the data stores 130, 200. The electronic communication may be over the Internet or any network 100 using any suitable electronic communication medium, communication protocol, and computer software including, without limitation: a wired connection, Wi-Fi or other wireless network, cellular network, or satellite network; TCP/IP or another open or encrypted protocol; browser software, application programming interfaces, middleware, or dedicated software programs. The electronic communication may be over another type of network 100, such as an intranet or virtual private network, or may be via direct wired communication interfaces or any other suitable interface for transmitting data electronically from a data storage 130 or data store(s) 200 to server 110. In some embodiments, data storage 130 may be a component of server 110, such as by being contained in a memory module or on a disk drive of server 110.

Data storage 130 (or data stores 200) may be any repository of information that is or can be made freely or securely accessible by server 110. Suitable data stores include, without limitation: databases or database systems, which may be a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future; file systems; and electronic files such as web pages, spreadsheets, and documents. Each data store accessible by server 110 may contain information that is relevant to the creation of the list of recommended domain names or organization-specific websites, including any website components as described below.

Server 110 may also access and aggregate data within data storage 130, possibly from data stores 200 available through third party services, including, without limitation to the illustrated examples: search engines; website information databases, such as domain registries, hosting service provider databases, website customer databases, and internet aggregation databases such as archive.org; government records databases, such as business entity registries maintained by a Secretary of State or corporation commission; public data aggregators, such as FACTUAL, ZABASEARCH, genealogical databases, and the like; social networking data stores, such as public, semi-private, or private information from FACEBOOK, TWITTER, FOURSQUARE, LINKEDIN, and the like; business listing data stores, such as YELP!, Yellow Pages, GOOGLE PLACES, LOCU, and the like; media-specific data stores, such as art museum databases, library databases, and the like, as described below.

Server 110 may automatically collect, from one or more third party data stores 200, information comprising public, semi-private, or private data. A plurality of content searches may be performed, possibly sequentially, in the one or more data stores 200, with later-occurring content searches using data collected from previous content searches as additional or alternative search terms associated with the metadata generated from a digital image using third party metadata generation services, as described below. Semi-private and private data may be accessed by prompting the user for security credentials, such as a username and password for FACEBOOK, YELP, or other social networking websites. Alternatively, where the user is an account holder for services offered by server 110, server 110 may have stored access information or may have otherwise previously obtained authorization from the user to access such semi-private or private data, such as by using an open or delegated authorization standard.

Collecting the data may comprise one or more data search and retrieval techniques, including scraping relevant data from the third party data stores 200 and/or web pages using any known content data extraction and aggregation or other scraping technique. The search results of the content searches may include raw data such as text, images, documents, and the like, data contained in structured or unstructured database records, data contained in one or more web pages, and other forms of structured or unstructured data. All or substantially all of the data in the search results may be potential content for the recommended domain names or for content for the generated organization-specific website(s), as described in more detail below.

The search results of the content searches and/or content data extractions may include raw data such as text, images, documents, and the like, data contained in structured or unstructured database records, data contained in one or more web pages, and other forms of structured or unstructured data. Server 110 may collect the relevant data from the content search results and/or content data extraction. Data may be identified as relevant based on one or a plurality of factors, including without limitation: currency of the data; size, including font size and image size; location within the source (i.e. placement on a web page); and, HTML tag information within the data, such as metadata or Microdata tags. In one implementation, the relevancy of data may be determined based upon a particular set of factors, such as name, address, geolocation (determined using the techniques disclosed below), and/or phone number. If these attributes are unavailable, other attributes can be employed to build a degree of confidence in the relevance of data. These factors can be, but are not limited to, User IP, image scanning, string matching, etc. Data is then standardized by data types such as name, address, location, phone number, Email, Social Handles, Operating Hours, and the like. Collecting the data may comprise scraping relevant data from the web pages or other sources using any known scraping technique. In some embodiments, one or more web pages identified in the identification or content searches and included in the collected data may be owned by the user. For example, server 110 may perform content searches and scrape to obtain the data that the user deemed relevant enough to include on his previous website. The data extracted by the content data extraction may be stored in data storage 130 as any combination of data fields, data records, data tables, and/or databases storing information.

A user of the disclosed system may be an individual, or any member of a group of individuals, a business, or any other organization or entity that desires to register a domain name and/or build and use a personalized website to convey commercial or non-commercial information about itself or another topic. For clarity of explanation, and not to limit the implementation of the present systems and methods, the systems and methods are described below as being performed by a server hardware computing device, or server 110, but in fact may be performed by any combination of specific computer-executable instructions that may be executed by one or more processors on server 110 and/or client 120 that receives input for registering a domain name, or creating a website for an organization, possibly a small business, such as a restaurant or bar, retail store, or service provider (i.e. barber shop, real estate or insurance agent, repair shop, equipment renter, and the like).

In the disclosed embodiments, a user of the disclosed system may access client 120 and/or server 110 via the user's client device 120. For example, client 120 may either access an application via server 110 (e.g., using a web browser 205), or may download and run client software 205, such as an app or one or more other client software application modules. As noted above, the disclosed embodiments may exist in a distributed model, possibly including instructions within the source code of the application, to distribute the client software 205 across various applications or websites, and/or embed it within a website or client app 205 (e.g., as a component of a WORDPRESS plugin).

In some embodiments, in the interest of cost savings, the software application 205 may be a progressive web app. This progressive web app may, for example, be downloaded and installed as a native mobile app, and configured to access network 100 in order to run. In some embodiments, the progressive web app may build a native app wrapper so that the code is the same across all platforms, thereby providing a single point of touch for the disclosed service.

Using the browser or client software 205, a user may access a GUI (possibly similar to those seen in FIGS. 4-5 and 9), including at least one GUI control for receiving a user input. This user input may be include a digital image captured using a camera included with a mobile device, or may include an HTML input form selecting the digital image stored on client 120 or in the cloud and any associated metadata. The captured digital image may include, as non-limiting examples: a scanned business card for an organization, a business storefront, a product offered by a business (e.g., a menu item in a restaurant, a house to be listed for a real estate website), etc. Client software 205 may then upload this data to server 110, or, in some embodiments, to one or more third party digital image analysis and metadata generation services described below. In some embodiments a plurality of users (e.g., customers) may upload a plurality of digital images, as opposed to a single user uploading a single image, in order to create a website for a business owner, as in the non-limiting examples described below.

The digital image may act as seed input used to generate a list of recommended domain names or a website, as disclosed below. As non-limiting examples and without limitation, this seed input may depict elements of the organization, for example: a business storefront, interior, signage, or menu; trade dress, such as employee uniforms, vehicle decoration, and the like; one or more of the user's products or works of art; a person associated with the business, such as the owner or executive chef; and any other images that may be used to identify the organization.

It should be noted, however, that any seed input may be used in the disclosed embodiments. For example, the seed input may be an image or still frame from a video (taken in real time using client software 205, or uploaded and stored on client 120), an audio recording, such as a dictation of identifying information that may be converted into text, a musical or spoken word performance that identifies an artist associated with the organization, or another audio recording that conveys identifying information about the organization, or may be a biometric data set, such as a fingerprint or retina scan collected by an attached peripheral and identifying the user as either an individual or an administrator of the organization, such as an owner of a business. In these examples, server software 210, running on server 110, may transcribe an audio recording, and further perform pattern analysis on the transcription, the recording, or both. Server 110 may identify and store, for example, heavily repeated words or words that are relatively heavily inflected as keywords, biometric or other data for an individual or administrator, etc. Server 110 may use this seed input to perform the information retrieval and prioritization, domain name suggestion, and website generation algorithms described below.

As noted above, in some embodiments, client 120 may capture and/or store a plurality of metadata associated with the digital image or other seed input. As a non-limiting example, client 120 may include a digital camera software for capturing digital images, as well as software for indicating the location of the smartphone when the photo was taken. Client 120 may capture data, in real time, such as the digital image's filename, image resolution, source device/software, location (e.g., GPS or latitude longitude data associated with or embedded in the image), capture date, etc. In some embodiments, client 120 may identify previously captured images (e.g., uploaded from a digital camera and stored on the client device and/or within the cloud, for example). In these embodiments, client 120 may crawl and identify any associated or embedded metadata or other data associated with the image.

In some embodiments, the metadata may include a physical location at which the digital image was captured. For example, the digital camera may identify GPS coordinates for the user of the digital camera, which then stores the GPS location metadata in association with the captured image, which is then stored on the mobile device or in the cloud. In some embodiments, client software 205 may work in conjunction with the camera software and the location software. Client software 205 may determine if the location software is activated, and if so, access the client's 120 current location (e.g., GPS coordinates, including latitude and longitude)

where the image is captured, and associate the identified location metadata with the captured image. If the location software is not activated, the client software 205 may either automatically activate the location software, or generate a notification (e.g., popup window, not shown) notifying the user that the location software is deactivated, and requesting permission to activate this feature. If authentication is required to access this feature, the user may input such authentication via the notification or another GUI input form.

In some embodiments (not shown in FIG. 4-5 or 9), client 120 and/or server 110 may generate a GUI to display the captured image and its associated data, prior to transmitting the data for analysis by server 110 or third party metadata generation services. In these embodiments, the user may provide user input correcting or supplementing any additional metadata associated with the captured image to be analyzed by server 110 and/or the third party metadata generation services, and stored by data storage 130. As non-limiting examples, the user may enter their location, if incorrectly or not previously captured, whether they are a small business owner, whether the image is of a business card or a physical store front, etc.

Client 120 may automatically transmit the captured image, along with any associated metadata, to server 110, or directly to one or more third party metadata generation services 215, for analysis. For efficiency purposes, the transmitted digital image and/or metadata may be compressed prior to transmission.

In some embodiments, server-side software 210 may include an Application Programming Interfaces (API) configured to receive (possibly via remote procedure calls (RPCs) from client 120), process, and/or store the received image and associated metadata.

In some embodiments, client 120 may send the digital image and/or associated metadata directly to one or more third party digital image analysis and metadata generation services (metadata services) 215 for analysis, thereby bypassing the initial analysis step by server 110. Either way, server 110 or the metadata services 215 may receive, from client 120, the transmitted image, the associated metadata, and/or any other data relevant to the captured image, and process them accordingly.

In some embodiments, the metadata services 215 may be accessible through one or more incorporated service bots 210 run on server 110 (and possibly included in server software 210) and configured to identify and connect to the metadata services 215, upload the received image and/or any associated metadata, and request analysis and processed metadata from the third party metadata generation services 215, possibly via an RPC to the appropriate metadata services API(s).

The metadata services 215 may process the digital image, along with any associated received metadata, and return metadata generated from the digital image by the metadata service(s) 215 to any applicable server software 210. The third party metadata generation services 215 may create a specific set of metadata generated from received images, each returning a different but coordinated set of returned metadata. Server 110 may then, as outlined below, generate an entity profile 220, including a plurality of data to be stored in association with the entity. This entity profile may, in turn, be used to generate a list of recommended domain names or a website personalized to the entity.

As non-limiting examples and as described in greater detail below, the metadata services 215 may include, but are not limited to reverse image lookup/search services, object identification services, metadata tagging services, sentence building services, similar image or audio matching services, color identification services, facial recognition services, logo identification and extraction services, Optical Character Recognition (OCR) services, geolocation services, and/or any other third party metadata generation services that analyze and generate metadata from a received digital image.

Image analysis services may perform a reverse image lookup and/or search based on the provided digital image. For example, if the digital image is from a real estate agent wanting to list a house, the reverse image lookup/search may extract object data, possibly as generated tags, from the photo, including: a house, a style of the house (e.g., Victorian . . . ), a person (e.g., the real estate agent), a real estate sign including a logo for the real estate brokerage, a dog in front of the house, etc. In some embodiments, the object or tag data may further include colors (possibly in conjunction with a color extraction service described below), such as a color of the house, or colors within the real estate sign, including trade dress for the real estate brokerage, etc. In some embodiments, the object or tag data may include facial or logo recognition (possibly in conjunction with a facial or logo recognition service described below) identifying the realtor listing the house and/or the associated real estate brokerage. In addition, the image analysis services may further extract data (e.g., scanning the property via image or video input from a mobile device) defining a floor plan, a square footage, a 3D model, various amenities of the house (e.g., flooring, roof, appliances, pool, etc.), or multiple photos from inside and/or outside the house. Similarly, if video is captured, the image analysis services may extract data for generating a video walk-through of the real estate property.

The object or tag data may further include any tags, keywords, and/or sentences describing the image using any combination of OCR and sentence building described below, and/or a location of the objects (e.g., the house address) using any combination of generated tags, OCR, or other location services.

Object identification services may include an API or other software 215 (E.g. Microsoft's COMPUTER VISION API) configured to analyze the visual content found in an image, identify the content, and generate and return metadata about the image. In some embodiments, this returned data or metadata may be tag-based, including descriptions (e.g., store front, house, business card, person, animal, etc.), domain-specific models, labels (e.g., CLOUDSIGHT's Image Classification), etc. As a non-limiting example, the software may return metadata including one or more tags (or a set of tags), or other data, including categories for, and/or details about, one or more subjects in the image, according to incorporated image analysis algorithms.

The returned tags may further include attributes of each object (e.g., the style of the house, the color of the house, etc.), metadata including a part of speech associated with the tag (e.g., noun, verb, adjective, etc.), more detailed child metadata associated with the more general parent metadata (e.g., contemporary house, craftsman house, Victorian style home, etc.). In some embodiments, the object identification service(s) may filter content (e.g., adult content).

Some object identification services, or additional services 215, may include neural network technologies that analyze various regions of the digital image, providing captioning models that include detailed descriptions of the subjects, the actions taken by the subjects, and the environment in which the subjects and actions are taking place, thereby providing one or more detailed sentences about the submitted image. As non-limiting examples, these may include NEURAL-TALK2, Deep Visual-Semantic Alignments for Generating Image Descriptions (which also create a sentence for each subject/object in the image), CLOUDSIGHT's Detailed Scene Understanding, etc.

Similar image or audio matching services may search databases, social media accounts, or any other image databases to match the digital image (or objects within the digital image) with any images in data storage 130 or in third party data stores 200, described in detail above. The similar image matching service may utilize techniques similar to facial recognition software, described herein (e.g., finding similar match points, colors, etc.), or may match data to the data associated with the file name, any associated metadata, etc. As a non-limiting example, Google's GOGGLES app receives an image (e.g., from a mobile device) and identifies paintings, landmarks, barcodes, QR codes, products, popular images, books, DVDs, CDs, any 2D image, etc. and provides a name and description. Alternatively, an image, one or more frames of a video, or a clip of an audio recording may be directly compared to one or more records in a database of media of the same type as one or more objects within the digital image. For example, a photo of a work of art may be compared to images in a copyright database in a government records database, or to an art museum database, to identify the artist and/or the location of the work.

As noted above, the object identification services, or other services 215, may include returned metadata describing details and/or attributes about each of the subjects/objects in the digital image. One example includes the colors of the subjects and/or objects. In some embodiments, specialized color extraction APIs (e.g., VIBRANT.JS) may be applied to the image to identify all colors associated with each subject/object in the image. As a non-limiting example, such a specialized color extraction API may identify, within each submitted image, a vibrant, muted, dark vibrant, dark muted, light vibrant, and light muted color palette for the submitted image. In some embodiments, these colors may represent the brand colors and/or trade dress associated with a business or its products (e.g., menu, logo, etc.)

Logo or product identification services may include an API or other software 215 configured to identify and extract logos or products from within the digital image. Logos may be extracted using, for example, Scale Invariant Feature Transform (SIFT) technologies to detect and extract the potential logos. This technology may detect corners, compute descriptors, and detect a nearest neighbor candidate. Products may be extracted using product identification technologies (e.g., CLOUDSIGHT's Fine-Grained Image Recognition), identifying product details such as brand, style, type, description, price, etc.

In some embodiments, in addition to receiving character and string metadata from the tags, text descriptions, and/or sentence building generated from the services 215 described above, an OCR services may include an OCR or other text analysis and identification software library configured to identify text or other characters within the digital image, and extract one or more characters and characters strings. As non-limiting examples, if the image were a store front, or a business card, for the organization, the OCR service may identify, within the image, characters or character strings identifying the organization or business name, contact information for the organization, or physical addresses for the organization (e.g., 123 main street), another location data for the organization, possibly cross referenced with the contact information and/or physical address for the organization.

The OCR software library may further include context analysis, which may include relative comparison of identified text, such as text size and placement on a photographed sign, in order to identify relative importance of extracted keywords. In other words, in some embodiments, the size of the text in relation to the photograph and/or other text within the image may create a priority over other metadata, or metadata within the same image. Image processing techniques may identify a graphic region that is compared to an image database to determine that the image depicts a storefront. Context analysis may arrange the identified text strings in order of descending text size. The image being identified as a storefront (possibly through the object identification services described above), it may be assumed that at least the largest text string appears on the signage. Further processing may ascertain the boundaries of the sign to determine if other text appears on the sign.

If the seed input is a media file, such as an image, video, audio recording, or another non-text input, server 110 may extract one or more keywords from the seed input in order to generate the metadata profile.

Any combination of server software 210, or location software provided by the metadata services 215 may identify a geographic region associated with the digital image. As described above, the geolocation may be determined from the metadata associated with or embedded within the digital image itself as captured by client software 205. In some embodiments, the geographic region may be derived from keyword metadata generated from the digital image. Alternatively or in addition, the geographic region may be derived from the IP address of client 120, which may geo-locate the user or the entity.

In other embodiments, the object identification software described herein may identify specific landmarks or other distinguishing characteristics of a house, park, etc., and identify the picture as having been taken at that location. The geolocation service (or possibly the server software modules, bots, etc.) may further use any provided geolocation data to identify a specific geographical entity (e.g., a house or park) based on the closest entity to the GPS or latitude/longitude data provided in the generated metadata. The software may further determine a city, state, country, etc., according to the provided GPS, latitude/longitude, or other geolocation data.

Server 110, including logic and/or rules 225 within server software, APIs, and/or bots 210 (referred to collectively as server 110 below), may receive and analyze the metadata generated by the metadata service(s) 215 from the digital image, possibly including metadata initially generated for, associated with, or embedded in the digital image. As non-limiting examples, the generated metadata may include, objects (e.g., store front, person, house, business card, etc.), object descriptions and/or subject matter, tags, keywords, phrases, OCR results (e.g., keywords, phrases, characters); GPS location data (e.g., house address), facial recognition data (e.g., human subjects in the digital image); logo recognition data; colors; etc.

The returned metadata may be combined with all previously aggregated data (e.g., third party data stores 200, metadata embedded within the digital image, etc.) in order to generate an entity profile 220 associated with an organization or a user. As described below, server 110 may use the stored data from this entity profile 220 to generate a list of recommended domain names, a website, an automatically populated HTML form, a product web page, etc.

As a preliminary step, server 110 may identify an entity to associate with the aggregated data aggregation. In some embodiments, server 110 may identify the organization or individual according to an authentication of a user to client 120 and/or the client software 205.

In some embodiments, server 110 may identify the entity by matching keywords, character strings, descriptions, etc. returned from the metadata services 215 with complimentary data in the third party data stores 200. Comparing the results may include identifying common data elements and comparing the contents of the data elements. Such data element matching may include identifying a matching business name, address, phone number, and other common identifying data elements using field identifiers from a form or database, text formatting such as HTML tags and text size and justification comparisons, punctuation pattern comparisons, and the like. Server 110 may extract such identifying data elements from the compiled search results and associate the identifying data elements with the entity candidates.

Similarly, where strings were returned using OCR, server 110 may dictate that a largest text string may be identified as the entity name. A middle size text string may be compared to categories and keywords in the categorization structure, as described below, to categorize the entity. A smallest text string contains only numbers and can be determined to be the street number in the entity's address. This information may be used to further identify the entity and to verify address information collected in the identification or content searches described herein. Some or all of the text may be identified as keywords.

Server 110 may then store this data as part of the entity profile 220 in association with the identified organization and/or user. If a metadata profile for the organization or user already exists, server 110 may store the entity profile data in association with the existing profile. In some embodiments, server 110 may store the metadata profile 220 as a collection of data sets, including data fields, data records, data tables, databases, etc.

As non-limiting examples, the entity profile 220 may include, in association with the organization or individual, keywords or descriptions from the analyzed image associated with the entity, an entity category (e.g., organization or business category, industry, or vertical), entity contact data, entity logos, colors, or other trade dress, retail products available through the entity (e.g., houses for real estate, a menu for a restaurant), etc.

Server 110 may identify an entity category for the entity profile 220 from the one or more stored character strings. The organization may be limited to a particular type of business, which may be derived from keywords in the stored character strings. A keyword or key phrase may directly identify the business type (i.e. "restaurant," "auto parts," "chiropractic") or suggest the business type (i.e. "diner," "donuts,"), allowing server 110 to narrow the search without input from the user. Server 110 may ignore a keyword for purposes of narrowing the identification searches by business type if the keyword is ambiguous (i.e. "clinic" could be a medical office or a mechanic, "spa" could be a massage parlor or a swimming pool store), or may query the user to clarify the business type. Server 110 may then create one or more entity category data fields and/or data records associated with the entity profile 220.

Server 110 may cross reference the returned metadata with data such as third party data stores 200 to identify, within the entity profile data, a trade dress, possibly including a logo or specific colors associated with the organization or individual. Server 110 may then create one or more trade dress data fields and/or data records associated with the entity profile 220.

Server 110 may further cross reference the returned metadata (e.g., location data) with data such as third party data stores 200 to identify contact data for the organization, such as address, email, or telephone contact data, as non-limiting examples. For example, in some embodiments, the logic/rules 225 may identify an organization by matching keywords and/or descriptions in the returned and received metadata with that stored in data storage 130 or in third party data stores 200. Server 110 may then create one or more contact data fields and/or data records associated with the entity profile 220.

The returned metadata may also include product data for one or more products identified from the digital image. Server 110 may identify, within the digital image, a product list (e.g., a restaurant menu as seen in FIG. 9), or a matrix barcode (e.g., QR code or UPC symbol). Server 110 may then cross reference this data with data such as third party data stores 200, to identify additional data (e.g., images, product names, product descriptions, prices, etc.). For example, in FIG. 9, the digital image may include the menu, and using OCR, each menu item may be identified, including a name, price, and possibly product description. In some embodiments, the matrix barcode may be cross referenced with third party data stores 200 to return the product name, description, and/or price associated with the matrix barcode. Server 110 may then create one or more product data fields and/or data records associated with the entity profile 220.

The metadata profile may include one or more human subjects identified from the digital image via facial recognition. Server 110 may cross reference the identified individuals with databases such as data storage 130 and third party data stores 200 to identify and generate one or more directory entries (possibly including contact information for the identified individuals) for the organization. For example, this directory information may include contact data for users of the system and/or employees of the organization. Server 110 may then create one or more directory records associated with the entity profile 220. In some embodiments, the data for the metadata profile may have been generated from multiple sources. In these embodiments, the user may provide access to additional users, who may then be provided authentication to edit the website based on the multiple sources, such as photos, videos, etc.

After generating the data records for all entity profile 220 data associated with the organization or individual, server 110 may categorize, prioritize, and otherwise organize the data sets within the entity profile 220. This organization may include defining relationships between the data, thereby creating a neural network throughout and between the entity profiles 220.

The organization of the data sets may also include a hierarchy or prioritization of data. In some embodiments, this hierarchy/prioritization may be based on the relationships between the stored data. For example, the priority of data may be based on relative sizes of objects or text within the digital image, frequency of keywords in descriptions or tags derived from the digital image, etc. The hierarchy/prioritization may further define relationships between multiple digital assets, such as when a user has captured multiple digital images and/or videos. In one non-limiting example, the combination of server software 210 may include pathing capabilities, or in other words, the combination of location of time, which may provide server 110 and server software 210 with a path and velocity which may provide further data for the analyses described herein. For example, using pathing algorithms, a determination may be made wherein a person traveled via plane rather than car, because the speed with which the user is located in a second location rather than a first location changed more quickly than would be possible in a car. Similarly, the time/location associated with the two locations may be too slow to be a car, and may therefore be determined that the user is walking. In a first non-limiting example, a user may take a photo of a street view of a house with a driveway, and then may take another picture of the front of the house. Server software 210 may determine that the person drove from the gate to the front of the house and may further calculate how long that may take. This data may be included as part of the website content. In another non-limiting example, a customer may take a picture of themselves at the airport before leaving on a trip, a photo out the window of the plane, and one when they land. Using this data, server software 210 may determine a flight for the user and a path from one point to another for a map to display on a website.

Using the examples in FIG. 4 (described in more detail below), a jeweler may scan a business card as the digital image. Server software 210 may associate a greater font size, weight, or emphasis within text content from the business card with a higher priority data than text content that does not have these features. The logic/rules 225 may therefore create a relationship in which the higher priority data (e.g., the name of the jeweler) is stored as parent data, and the lower priority data (e.g., tagline, location, contact data, logo, colors, etc.) is stored as child data associated in the database with the parent data and the entity profile 220.

Similarly, in FIG. 5, if a real estate agent were to capture a digital image of a house taking up the majority of space within the digital image, with a real estate sign and a dog in the foreground, server 110 may determine that the house, and possibly its address, is a higher priority and therefore a parent object. The dog or the real estate sign may be associated as child data with the parent data, which may indicate a specific real estate broker or that the house is in a dog-friendly neighborhood, and data to this effect may be stored in association with the entity profile 220. Description data (e.g., "Victorian," address, location etc.) may also be stored as child data in association with the parent data for the house.

In some embodiments, the server may generate a GUI (not shown) presenting the user with all data stored within the entity profile 220 in association with the organization or individual, including the relationships, priorities, hierarchies, and parent/child relationships described above. The user may review the data from the generated entity profile 220 and confirm that the data is accurate or correct the data accordingly. In some embodiments, the user feedback may feed into an artificial intelligence features, using techniques to machine learn from the user feedback.

In some embodiments, the user feedback may include the user's determination of the most useful metadata, features of the system, and the demographics using the metadata and features.

In some embodiments, server 110 may collect and store the images and associated metadata and generate a database associating the images, any identified objects, and the generated metadata received, in order to create its own image recognition server. Server 110 would therefore no longer require calls to other APIs. Users could access the image recognition server to perform reverse image lookups on submitted digital images, and as more data is added and refined, (possibly through artificial intelligence), performance of the image recognition server would continue to improve.

As previously noted, server 110 may use any data available within the entity profile 220 to automatically generate a list of recommended domain names and/or generate websites, possibly including websites requested by parties outside the entity, or web pages for products, organization directories, schedules, contact data, form data, etc.

Figure 3:
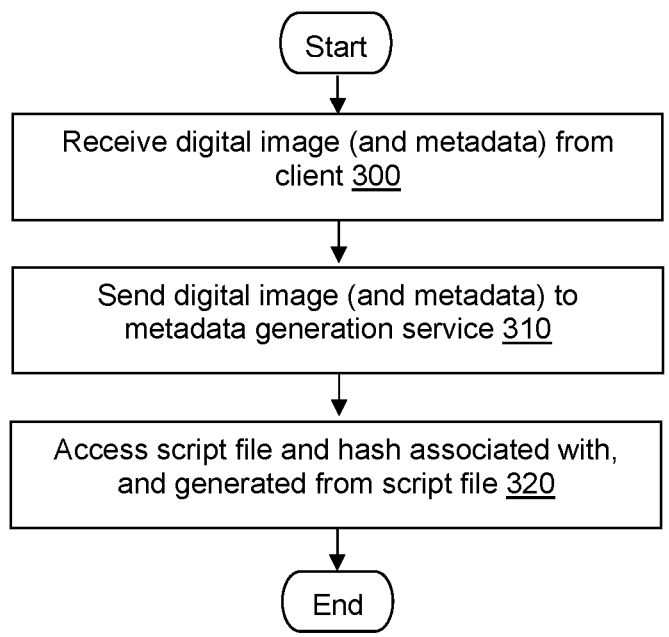
FIG. 3 is a flow diagram of an example embodiment of a method or process of recommending domain names and automatically generating an organization-specific website from digital image metadata.

FIG. 3 demonstrates a flow chart including a plurality of process/method steps common to each domain name recommendation and automated website generation process described herein. In step 300, a server hardware computing device 110, coupled to a network 100 and comprising at least one processor executing specific computer-executable instructions within a memory, decodes a transmission from a client hardware computing device 120 encoding a digital image, possibly including digital image metadata describing one or more attributes of the digital image (e.g., location, filename, date/time). The digital image and associated metadata may have been captured and/or selected by a user operating client 120, and using client software 205, as described above.

In step 310, the server hardware computing device transmits the digital image, and possibly the associated metadata (possibly as an RPC to an API), to one or more metadata services 215, such as the non-limiting example services described above, which are configured to extract and/or generate metadata from the digital image. In step 320, server 110 receives the metadata generated by the one or more services, and encodes an entity profile 220 from the data set extracted and/or generated from the digital image, as described above.

The non-limiting examples in FIGS. 4-5 and 9 help to demonstrate the utility of the disclosed invention. In a first non-limiting example seen in FIG. 4, the operator of the client machine, John Doe, may be an owner of a small business jewelry store, John Doe Jewelers and Company, desiring a domain name and a website for the jewelry store. In this example, the jewelry store owner may take a photograph of his business card using his mobile device, or may scan the business card using a scanner.

Any combination of client software 205 and server software 210 may identify location, date, file, and other metadata associated with or embedded within the business card image (JohnDoeJewelersBusinessCard.jpg), and may transmit the image and any associated metadata to one or more of the metadata services 215. Server 110 may then receive the metadata generated from these services 215, and generate an entity profile 220 for John Doe Jewelers and Company. Using the data within this entity profile 220, server 110 may identify, using the software logic and/or rules 225, the business name as John Doe Jewelers and Company, the industry category as jewelry or jewelers, the business location as 123 Higuera San Luis Obispo, Calif., any additional contact data for the business, the logo for the business (shown as stylized text in FIG. 4), and any additional descriptions, keywords, phrases, or other character strings that describe the business.

In a second non-limiting example seen in FIG. 5, the operator of the client machine, Jenny Smith, may be an agent for a real estate brokerage, Acme Real Estate, and may desire a domain name and to create a satellite web page for a house to be listed on the broker's website. The satellite web page may be for a Victorian house located at 123 Main Street. In this example, the real estate agent may take a photograph of the property using a digital camera or her mobile device.

Any combination of client software 205 and server software 210 may identify location, date, file, and other metadata associated with the digital image of the house, (123MainStreetVictorianHouse.jpg) and may transmit the image and any associated metadata to one or more of the metadata services 215. Server 110 may then receive the metadata generated from these services, and generate an entity profile 220 for Jenny Smith, Acme Real Estate, and/or the property located at 123 Main Street. Using the data within this entity profile 220, server 110 may identify, using the software logic and/or rules 225, Acme Real Estate as the real estate brokerage (e.g., from logo recognition of a real estate sign in the image and profile data generated from third party data stores 200), Jenny Smith as the agent (e.g., using facial recognition software of the agent's face in the image), the location as 123 Main Street, Anywhere USA (e.g., using location software, OCR of the house address in the image, or a GPS location software on Jenny's client device 120), and any additional descriptions, keywords, phrases, or other character strings that describe the objects within the captured digital image.

Figure 6:
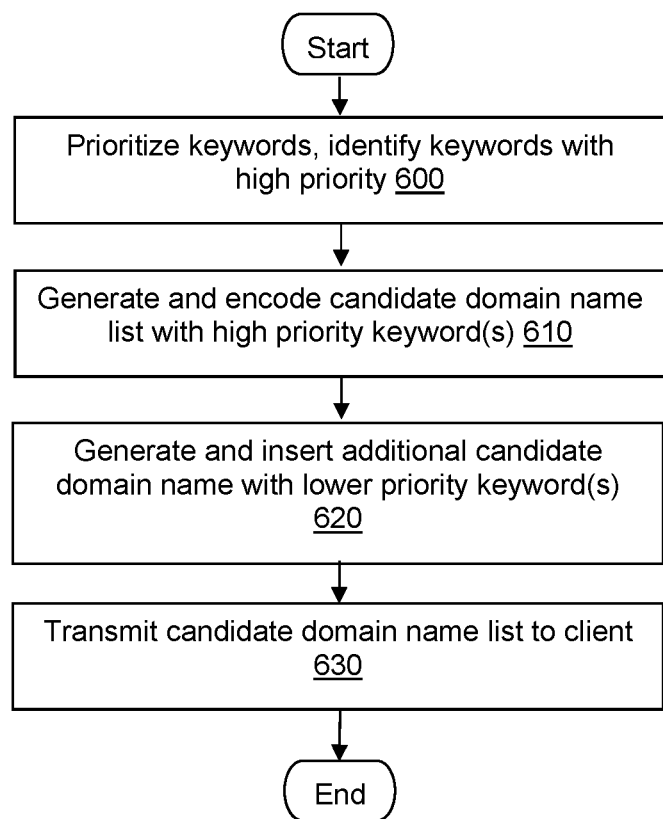
FIG. 6 is a flow diagram of an example embodiment of a method or process of recommending domain names and automatically generating an organization specific website from digital image metadata.

FIG. 6 demonstrates a flow chart including a plurality of process or method steps for suggesting or recommending one or more domain names to one or more entities using data in the associated entity profile 220.

Server 110 performs the common process/method steps, as described in detail regarding FIG. 3 above. In step 600, server 110 applies software logic and/or rules 225 to the data within the entity profile 220, in order to prioritize a plurality of keywords within the data set. One or more of these keywords are associated with a high priority. As non-limiting examples, a high priority may be determined according to: a font size, weight, or emphasis of the at least one keyword within a scanned document captured in the digital image; a frequency of the at least one keyword within a description or a tag associated with one or more objects identified within the digital image; or a size of the at least one keyword relative to at least one additional text string extracted from the digital image using OCR.

In step 610, server 110 encodes a list of domain names comprising at least a first candidate domain name including the at least one keyword, and in step 620, server 110 generates one or more additional candidate domain names including at least a second candidate domain name comprising one or more additional keywords replacing or concatenated to the at least one keyword. The at least one additional keyword is associated with a lower priority than the at least one keyword. For example, the at least one additional keyword may be a child data associated with the at least one keyword identified as the parent data.

Server 110 then inserts the one or more additional candidate domain names into the list of domain names, and in step 630, transmits the list of candidate domain names to client 120 for display to the user operating the client 120. In some embodiments, server 110 determines whether any of the domain name candidates are unavailable for registration, and if so, removes the unavailable domain name from the list of candidate domain names and replaces it with the one or more additional domain names as described above.

Returning to FIGS. 4-5, and continuing the Jeweler and Real Estate examples above, in FIG. 4, the character string "John Doe Jewelers and Company" is identified as a high priority character string due to its larger, bolded, and emphasized font on the business card. Thus, johndoe.com, and johndoe.us (based on the identified location of the image and/or other entity profile 220 data) are recommended as high priority domain names, being provided first in the domain name list. The lower priority metadata, including the organization category and location of the jewelry store as child data is concatenated to the high priority keywords to generate candidate domain names johndoejewelers.com and johndoesanluisobispo.com respectively. Finally, the lower priority location data is used to generate candidate domain names 123higuera.com and sanluisobispo.city, thereby replacing the character string "johndoe" entirely.

In FIG. 5, 123 Main Street, identified from the location software, is identified as a high priority phrase due to the size of the house within the digital image, and possibly due to the identified entity being a real estate brokerage. Thus, 123mainstreet.com is recommended as a high priority domain name, being provided first in the domain name list. The lower priority metadata, including the house style and agent name as child data, is concatenated to the high priority keywords to generate candidate domain names 123mainstreet-victorian.com and 123mainstreet-jennysmith.com.

Figure 7:
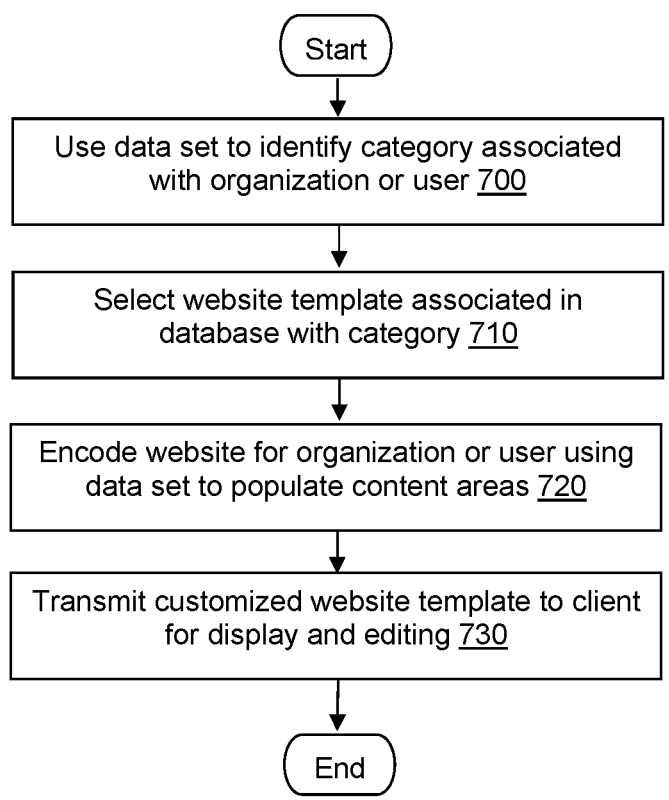
FIG. 7 is a flow diagram of an example embodiment of a method or process of recommending domain names and automatically generating an organization specific website from digital image metadata.

FIG. 7 demonstrates a flow chart including a plurality of process and/or method steps for automatically generating a website for one or more entities using data in the associated entity profile 220.

Server 110 performs the common process/method steps described in detail in relation to FIG. 3 above. In step 700, server 110 applies software logic or rules 225 to the data within the entity profile 220, and identifies, within the data set: a first at least one keyword matching a second at least one keyword associated, in a database coupled to the network, with an organization category; an organization or user name; an organization or user contact data; and an organization trade dress comprising an organization logo or an organization color theme.

In step 710, server 110 executes a database query to identify and select, within a database 130 coupled to server 110, a website template associated in the database with the identified organization category. As seen in FIGS. 4-5, server 110 may generate a sample website having a layout and the potential content arranged within the layout. The layout may be derived from a website template stored in a content framework, or stored in a template database and identified by the content framework. The content framework or template database may include a plurality of templates. A template may include one or more web pages and one or more content regions on each of the web pages. Each content region may describe a position and area on a web page. Each content region may identify the potential content, such as an image, text, or one or more content objects, that is to be inserted into the content region. Server 110 thereby may generate a website that displays the inserted content at the content region's location on the web page. The arrangement of content regions and selection of content to be displayed therein may be designed according to one or more categories associated with the template. Specifically, where server 110 has identified the potential content in light of the organization's categories, the one or more templates associated with the relevant categories include web pages and frames that arrange and present the appropriate potential content.

FIG. 4 illustrates an example template for a sample website in the jeweler category, and FIG. 5 illustrates an example template for a sample website in the real estate category. Each template includes page layouts for a plurality of web pages that commonly appear on a website for the appropriate category. For example, an "About Us/Contact" page, a "Jewelry" page for a jewelry website, and a "Listings" page for a real estate website. The "about" page layout may include an organization background, such as history of the organization or biographies of the owners; and a "contact" page layout for displaying addresses, phone numbers, driving directions, email feedback forms, and the like. Each content region may be associated with a particular type of content or data (for example, as identified by the parameters of the content framework) in the potential content. To the extent particular data stores or data sources are likely to contain suitable data or content for a particular content region (e.g., a data store that includes only text may not be a suitable data source for content to populate a content region that calls for an image), the content regions may be associated with one or more particular data source. The associated data sources may further be prioritized to instruct server 110 of a preferred order in which to search the potential content retrieved from the prioritized data sources.

In step 720, server 110 encodes an organization website comprising the organization name, the organization contact data, and the organization trade dress. The encoded organization website may also include and plurality of website content generated from the data set, wherein the website template is populated according to: at least one content area defined within the website template; and at least one metadata in the data set matching at least one keyword within a definition of the at least one content area. The website content may include the digital image, or a text content according to the metadata set/entity profile returned by the at least one service.

Server 110 may identify potential content by analyzing the entity profile 220 in light of the one or more organization categories. In some embodiments, the server 110 may utilize a content framework that describes data elements that commonly appear as website content for each category of business. The content framework may include parameters or filters such as keywords, data structures, identifiers for HTML forms, tables, or other website elements, and the like, which server 110 may compare to collected data to determine if the data is suitable content to be incorporated into the website. For example, if a particular portion of the potential content is identified, through the use of the content framework as "about us" data, that data can then be incorporated into the "about us" section of the webpage. Similarly, if a portion of the potential content is identified by the content framework as a business address, that information can then be used to display a map on the website that depicts the location of the address.

The content framework may include parameters that apply to all categories, parameters that apply to a subset of categories, parameters that apply to a single category including or excluding its subcategories, and parameters that apply only to one or more subcategories. Non-limiting examples of parameters that apply to all categories include entity name, address, phone number, and email address. Non-limiting examples of parameters that apply to a subset of categories include business hours, customer reviews or testimonials, social media mentions, brand-relevant images, promotions, locations, service lists, and price lists. Non-limiting examples of parameters that apply to a single category or sub-category include menus (to restaurants, including bars), images of haircuts (to hair salons), and the like. Server 110, informed by the content framework, may create content objects by grouping, arranging, and classifying the data elements in the potential content according to the content framework parameters by which the data elements were identified as potential content.

In step 730, the server 110 transmits the customized website template to client 120 for display to a user operating the client hardware computing device.

In some embodiments, server 110 may generate a GUI to present the populated website template to the user, including options to the user for modifying the content. For example, in FIGS. 4-5, a user may select the "Edit" links to access additional GUI forms, allowing the user to modify the content as displayed. Server 110 may present a popup for the logo, or a popup for potential photographs to be selected, or a "browse" or "upload" button for the user to provide his own image files.

Publish Website to Different Platforms

After verification by the user, server 110 may publish some or all of the website. In some embodiments, the website may be published to other platforms. For example, as illustrated, server 110 may generated a website for display at URL, www.johndoe.com, owned or operated by the organization. Server 110 may further display a widget (not shown) to the user for publishing to its social media platforms, connecting to the organization's FACEBOOK, TWITTER, GOOGLE+, and YELP accounts. The user can click on one of the connected platforms to publish the new content there.

Returning to FIGS. 4-5, and continuing the Jeweler and Real Estate examples above, in FIG. 4, server 110 may use the layout (e.g., size, emphasis, etc.) of the character strings on the business card, the frequency of variations of the word "jewelry," and any cross-referenced data in third party data stores 200, or any other industry related data to identify John Doe Jewelers and Company as a jewelry organization. Server 110 may therefore automatically query database 130 to identify and select a website template associated with the identified organization category "jewelry," such as the example template seen in FIG. 4. The simplified website template in this example may include links for organization content (e.g., represented by the About Us/Contact link, which displays the populated web page in FIG. 4), and links specifically designed to display industry content, such as jewelry inventory, prices descriptions, etc. (e.g., represented by the Jewelry link in FIG. 4).

In FIG. 4, server 110 has encoded the organization website, including the organization name (John Doe Jewelers), contact data (123 Higuera, San Luis Obispo, Calif.), trade dress (e.g., the logo, and/or any colors specific to the jewelry store), and website content generated from the data set, populated according to content areas defined in the website template and matching metadata from the entity profile 220.

In FIG. 5, server 110 may use the high priority entity data (e.g., location, identified individual, associated brokerage, etc.), the frequency of variations of the word "real estate," and any cross-referenced data in third party data stores 200 to identify Acme Real Estate as a real estate organization, Jenny Smith as an agent for the real estate organization, and 123 main street as a property to be listed, possibly as a satellite web page on Acme's real estate website. Server 110 may therefore automatically query database 130 to identify and select a website template associated in the database with the identified organization category "real estate," such as the example template seen in FIG. 5. This simplified website template may include links for organization or agent content (e.g., represented by the About Us/Contact link, which displays the populated web page in FIG. 5), and links specifically designed to display industry content, such as real estate listings, house styles, asking prices, images, descriptions, etc. (e.g., represented by the Listings link in FIG. 5).

In FIG. 5, server 110 has encoded the organization website, including the organization name (Acme Real Estate), the agent's name (Jenny Smith), the listing/property to be listed (123 Main Street), trade dress (e.g., the Acme logo, and/or any colors specific to Acme Real Estate), and website content generated from the data set, populated according to content areas defined in the website template and matching metadata from the entity profile 220.

Figure 8:
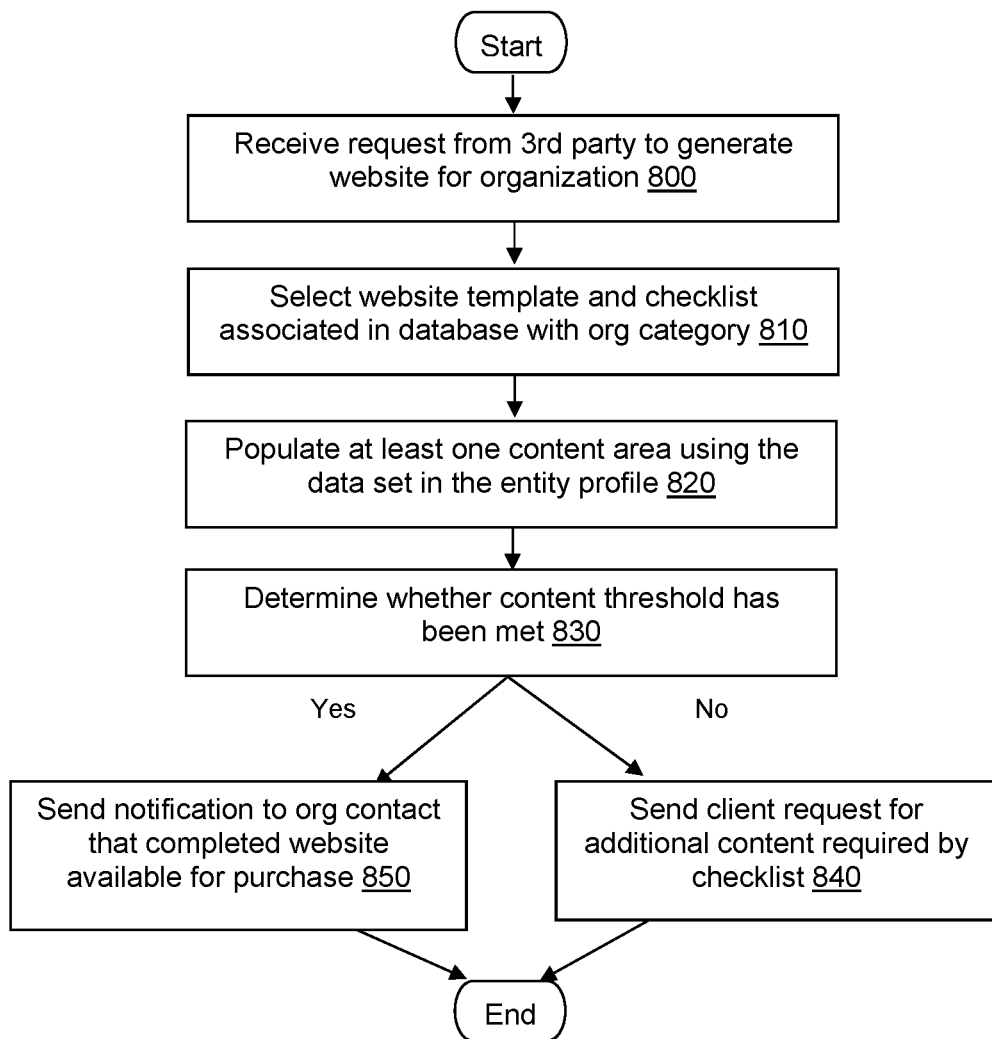
FIG. 8 is a flow diagram of an example embodiment of a method or process of recommending domain names and automatically generating an organization specific website from digital image metadata.

FIG. 8 demonstrates a flow chart including a plurality of process or method steps for automatically generating a website for one or more entities using data in the associated entity profile 220 in response to a request for a website by one or more third parties.

In step 800, server 110 decodes a transmission from at least one client hardware computing device 120 encoding a request to generate a website for an organization. In step 810, server 110 then executes a first database query selecting, from a database coupled to the network and in association with an organization category identified from the request: a website template; and a checklist 230 of a plurality of website content, the checklist 230 defining a threshold of content required to populate the website template for a completed website.

Server 110 then performs the common process/method steps, as described in detail regarding FIG. 3 above.

In step 820, server 110 populates at least one content area in the website template using the data set. In step 830, server 110 determines whether the threshold of content has been met. If not, in step 840, server 100 encodes a request, transmitted to client 120, for an additional content required by the checklist 230; and receives, from client 120, the additional content. However, if the threshold of content has been met, in step 850, server 110 encodes a notification to a contact within the organization that the completed website is available for purchase, and in step 860, transmits the request to client 120.

The non-limiting example in FIG. 9 helps to demonstrate the utility of the disclosed invention. In the non-limiting example seen in FIG. 9, the administrator for the entity may be an owner of a restaurant, The Greasy Spoon. Several of the restaurant's customers may be impressed with the restaurant, but the restaurant may not have an Internet presence in the form of a website, and the customers may desire a website for the restaurant to, for example, review menu items and/or order online.

In this example, one or more of these customers may access, for example, a website provided by the hosting provider and requesting generation of a website for a restaurant. Server 110 may use the request, or any other information available for the entity, such as third party data stores 220, to identify an organization category, specifically restaurants, and execute a database query selecting from the database a website template for a restaurant, and a checklist 230 defining a threshold of content required for a restaurant website.

In FIG. 9, the customer has captured a digital image of the menu for The Greasy Spoon, and has uploaded the digital image, possibly using client software 205. Server 110 may use the format of the menu or frequency of variations of the keywords on the menu, and any cross-referenced data in third party data stores 200, or any other industry related data to identify The Greasy Spoon as a restaurant, and the image as a menu for the restaurant. Server 110 may therefore automatically query database 130 to identify and select a website template associated with the identified organization category "restaurants" and/or "menus" such as the example template seen in FIG. 9. The simplified website template in this example may include links for organization content (e.g., represented by the About Us/Contact link), and links specifically designed to display industry content, such as menu items, prices, descriptions, etc. (e.g., represented by the Menus link, which displays the populated web page in FIG. 9).

In FIG. 9, server 110 has populated the menu section, including menu items and prices, using the submitted image. FIG. 9 also displays the status of all items on the threshold of content required to populate the website template for a completed website and the status of each checklist item. In this example, the checklist item for menu listing and prices is complete. Server 110 may generate a copy of the checklist status, and transmit to one or more additional customers who have requested the website. Each of these customers may use any combination of client or server software 205/210 to upload digital images of: The Greasy Spoon's storefront; the owner of The Greasy Spoon, images or descriptions of the menu items, and/or location and contact data, as non-limiting examples.

Once the threshold for a completed website has been met, server 110 may automatically transmit a link to a contact for the owner of The Greasy Spoon, demonstrating the completed website and offering it for sale.

As noted above, server 110 may utilize the data in entity profile 220 for many additional uses. For example, server 110 may create a directory, schedule, etc. for calendar events within the organization. In one example, server 110 may execute specific computer-executable instructions within a memory, thereby causing the system to perform the common process/method steps, as described in detail regarding FIG. 3 above, including a plurality of digital images, and identify, within a data set for the entity: a common geographical location from which the plurality of digital images were transmitted; an organization identifier comprising an organization name or an organization trade dress comprising an organization logo or an organization color theme; at least one human subject via facial recognition; and a regular interval in which the at least one human subject and the at least one organization identifier are identified within the plurality of digital image(s).

Server may then encode: an organization directory comprising the at least one human subject and at least one contact data for the at least one human subject; and an electronic calendar event schedule for the organization comprising an event for the organization taking place at the geographic location at the regular interval, and transmit the organization directory and the electronic calendar event to the client hardware computing device for display to a user operating the client 120.

In another example, server 110 may execute specific computer-executable instructions within a memory, thereby causing the system to perform the common process/method steps, as described in detail regarding FIG. 3 above, and identify, within the data set: an organization associated with the image; and a product listing comprising a product name or product description, and a price for a product, or a matrix barcode that when scanned returns the product name or product description and the price. Server 110 may then encode an organization website for the organization comprising at least one product web page including the product name or product description and the product price, and transmit the organization website to the client hardware computing device for display to a user operating the at client hardware computing device.

In another example, server 110 may execute specific computer-executable instructions within a memory, thereby causing the system to perform the common process/method steps, as described in detail regarding FIG. 3 above, and identify, within the data set, an organization name and at least one contact data for an organization associated with the image. Server 110 may then receive from the client hardware computing device a request for at least one Internet-based product, and responsive to the request causing a display of a Hypertext Markup Language (HTML) order form within a GUI (seen in FIGS. 4-5), automatically populate at least one form element within the HTML order form, wherein at least one string within the data set matches a string identifier for the form element.

In one implementation, the present disclosure provides systems and methods including a server hardware computing device 110 coupled to a network 100 and comprising at least one processor executing specific computer-executable instructions within a memory that, when executed, cause the system to: decode, from a client hardware computing device 120 coupled to the network 100, a transmission encoding a digital image; transmit the digital image to an application programming interface (API) operated by at least one service generating a metadata from the digital image; receive, from the at least one service, a data set of metadata generated from the digital image; prioritize a plurality of keywords within the data set, wherein at least one keyword is associated with a high priority, according to: a font size, weight, or emphasis of the at least one keyword within a scanned document captured in the digital image, a frequency of the at least one keyword within a description or a tag associated with one or more objects identified within the digital image, or a size of the at least one keyword relative to at least one additional text string extracted from the digital image using optical character recognition (OCR); encode a list of candidate domain names comprising a first candidate domain name including the at least one keyword; insert into the list of candidate domain names a second candidate domain name comprising at least one additional keyword replacing or concatenated to the at least one keyword, the at least one additional keyword being associated with a lower priority than the at least one keyword; and transmit the list of candidate domain names to the client hardware computing device for display to a user operating the client hardware computing device.

In another implementation, the present disclosure provides systems and methods including a server hardware computing device coupled to a network and comprising at least one processor executing specific computer-executable instructions within a memory that, when executed, cause the system to: decode, from a client hardware computing device coupled to the network, a transmission encoding a digital image; transmit the digital image to an application programming interface (API) operated by at least one service generating a metadata from the digital image; receive, from the at least one service, a data set of metadata generated from the digital image; identify, within the data set: a first at least one keyword matching a second at least one keyword associated, in a database coupled to the network, with an organization category, an organization name, an organization contact data, and an organization trade dress comprising an organization logo or an organization color theme; execute a database query selecting a website template associated in the database with the organization category; encode an organization website comprising: the organization name, the organization contact data, and the organization trade dress; and a plurality of website content generated from the data set, wherein the website template is populated according to: at least one content area defined within the website template; and at least one metadata in the data set matching at least one keyword within a definition of the at least one content area; and transmit the website to the client hardware computing device for display to a user operating the client hardware computing device.

In another implementation, the present disclosure provides systems and methods including a server hardware computing device coupled to a network and comprising at least one processor executing specific computer-executable instructions within a memory that, when executed, cause the system to: decode, from at least one client hardware computing device coupled to the network, a transmission encoding a request to generate a website for an organization; execute a first database query selecting, from a database coupled to the network and in association with an organization category identified from the request: a website template, and a checklist of a plurality of website content, the checklist defining a threshold of content required to populate the website template for a completed website; decode, from a client hardware computing device coupled to the network, a transmission encoding a digital image; transmit the digital image to an application programming interface (API) operated by at least one service generating a metadata from the digital image; receive, from the at least one service, a data set of metadata generated from the digital image; populate at least one content area in the website template using the data set; responsive to a determination that the threshold of content is not met: encode a request, transmitted to the at least one hardware computing device, for an additional content required by the checklist, and receive, from the at least one client hardware computing device, the additional content; and responsive to a determination that the threshold of content is met: encode a notification to a contact within the organization that the completed website is available for purchase, and transmit the notification to a client hardware computing device operated by the contact.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In some embodiments, the disclosed apparatus and methods (e.g., see the various flow charts described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium.

The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention has been described in terms of one or more preferred embodiments, and it should be appreciated that many equivalents, alternatives, variations, and modifications, aside from those expressly stated, are possible and within the scope of the invention.

The invention claimed is:

1. A system comprising a server hardware computing device coupled to a network and comprising at least one processor executing specific computer-executable instructions within a memory that, when executed, cause the system to:
   decode a transmission encoding a digital image, wherein the transmission encoding the digital image is generated from a client hardware computing device coupled to the network;
   utilize an application programming interface (API) operated by at least one service to generate a metadata from the digital image;
   determine a dataset of keywords from the metadata;
   utilize a trained neural network model to generate, from the dataset of keywords a dataset of prioritized keywords that have been prioritized based on a significance hierarchy that is indicative of a significance ranking of each respective keyword within the digital image;
   wherein the trained machine learning model is trained at least in part using at least one feedback input received from the client hardware computing device;
   wherein the significance hierarchy comprises at least one keyword associated with a high priority determined, according to at least one of:
      i) a font size, weight, or emphasis of the at least one keyword within the digital image,
      ii) a frequency of the at least one keyword within a description or a tag associated with one or more objects identified within the digital image, or
      iii) a size of the at least one keyword relative to at least one additional text string extracted from the digital image using optical character recognition (OCR);
   identify at least one higher-significance keyword from the dataset of prioritized keywords based on the significance hierarchy;
   encode a list of candidate domain names comprising a first candidate domain name including the at least one keyword;
   insert into the list of candidate domain names a second candidate domain name comprising at least one additional lower-significance keyword replacing or concatenated to the at least one higher-significance keyword, wherein the at least one additional lower-significance keyword is associated with a lower significance than the at least one higher-significance keyword based on the significance hierarchy; and
   transmit the list of candidate domain names to the client hardware computing device for display to a user operating the client hardware computing device.

2. The system of claim 1, wherein the client hardware computing device is configured to crawl the digital image to identify at least one metadata, associated with or embedded within the digital image, and transmit the at least one metadata to the server hardware computing device or the at least one service, the at least one metadata comprising:
   a filename for the digital image;
   a source of the digital image;
   a location at which the digital image was captured; or
   a date on which the digital image was captured.

3. The system of claim 1, wherein the at least one service comprises a metadata generation service including:
   a reverse image lookup service; or
   an object identification service.

4. The system of claim 1, wherein the at least one service comprises a metadata generation service including:
   a metadata tagging service;
   a sentence building service; or
   an optical character recognition service.

5. The system of claim 1, wherein the at least one service comprises a metadata generation service including:
   a facial recognition service;
   a logo recognition service; or
   a color recognition service.

6. The system of claim 1, wherein the at least one service comprises a metadata generation service including a geolocation service.

7. The system of claim 1, wherein the data set of metadata generated from the at least one service comprises:
   a facial recognition data;
   a name for an entity associated with the digital image;
   an industry category for the entity;
   a plurality of keywords or additional text content describing the entity;
   a contact data for the entity; or
   a trade dress, comprising a trade logo or one or more trade colors, for the entity.

8. The system of claim 1, wherein:
   the data set of metadata is organized into at least one parent data associated with a higher priority entity data and at least one child data associated with the parent data; and
   the server hardware computing device stores the at least one child data in a database in association with the at least one parent data.

9. The system of claim 1, wherein the specific computer-executable instructions further cause the system to automatically encode at least one product web page from the data set of metadata.

10. The system of claim 1, wherein the specific computer-executable instructions further cause the system to automatically populate at least one electronic form using the data set of metadata.

11. A method comprising the steps of:
decoding, by a server hardware computing device coupled to a network and comprising at least one processor executing computer-executable instructions within a memory, a transmission encoding a digital image, wherein the transmission encoding the digital image is generated from a client hardware computing device coupled to the network;
utilizing, by the server hardware computing device, an application programming interface (API) operated by at least one service to generate a metadata from the digital image;
determining a dataset of keywords from the metadata;
utilizing a trained neural network model to generate, from the dataset of keywords a dataset of prioritized keywords that have been prioritized based on a significance hierarchy that is indicative of a significance ranking of each respective keyword within the digital image;
wherein the trained machine learning model is trained at least in part using at least one feedback input received from the client hardware computing device;
wherein the significance hierarchy comprises at least one keyword associated with a high priority determined, according to at least one of:
  i) a font size, weight, or emphasis of the at least one keyword within the digital image,
  ii) a frequency of the at least one keyword within a description or a tag associated with one or more objects identified within the digital image, or
  iii) a size of the at least one keyword relative to at least one additional text string extracted from the digital image using optical character recognition (OCR);
identifying at least one higher-significance keyword from the dataset of prioritized keywords based on the significance hierarchy;
encoding a list of candidate domain names comprising a first candidate domain name including the at least one keyword;
inserting into the list of candidate domain names a second candidate domain name comprising at least one additional lower-significance keyword replacing or concatenated to the at least one higher-significance keyword, wherein the at least one additional lower-significance keyword is associated with a lower significance than the at least one higher-significance keyword based on the significance hierarchy; and
transmitting the list of candidate domain names to the client hardware computing device for display to a user operating the client hardware computing device.

12. The method of claim 11, further comprising the steps of crawling, by the client hardware computing device, the digital image to identify at least one metadata, associated with or embedded within the digital image, and transmitting the at least one metadata to the server hardware computing device or the at least one service, the at least one metadata comprising:
a filename for the digital image;
a source of the digital image;
a location at which the digital image was captured; or
a date on which the digital image was captured.

13. The method of claim 11, wherein the at least one service comprises a metadata generation service including:
a reverse image lookup service; or
an object identification service.

14. The method of claim 11, wherein the at least one service comprises a metadata generation service including:
a metadata tagging service;
a sentence building service; or
an optical character recognition service.

15. The method of claim 11, wherein the at least one service comprises a metadata generation service including:
a facial recognition service;
a logo recognition service; or
a color recognition service.

16. The method of claim 11, wherein the at least one service comprises a metadata generation service including a geolocation service.

17. The method of claim 11, wherein the data set of metadata generated from the at least one service comprises:
a facial recognition data;
a name for an entity associated with the digital image;
an industry category for the entity;
a plurality of keywords or additional text content describing the entity;
a contact data for the entity; or
a trade dress, comprising a trade logo or one or more trade colors, for the entity.

18. The method of claim 11, wherein:
the data set of metadata is organized into at least one parent data associated with a higher priority entity data and at least one child data associated with the parent data; and
the server hardware computing device stores the at least one child data in a database in association with the at least one parent data.

19. The method of claim 11, wherein the specific computer-executable instructions further cause the system to automatically encode at least one product web page from the data set of metadata.

20. The method of claim 11, further comprising the step of automatically populating, by the at least one server hardware computing device, at least one electronic form using the data set of metadata.

* * * * *